Patented June 3, 1952

2,599,401

UNITED STATES PATENT OFFICE 2,599,401

PROCESS OF OBTAINING CRYSTALLINE PENICILLIN SALTS

John A. Leighty, Indianapolis, Ind., assignor to Eli Lilly and Company, Indianapolis, Ind., a corporation of Indiana No Drawing. Application August 15, 1947, Serial No. 768,931

6 Claims. (Cl. 260—239.1)

It is the object of my invention to obtain more quickly and simply crystalline salts of penicillin with a base of the class consisting of sodium and potassium; and more particularly those penicillin salts in which the penicillin is at least predominantly penicillin G, more recently called benzyl penicillin. It is a special object of my invention to obtain these crystalline salts of penicillin directly from the first organic-solvent extract, desirably an amyl or butyl acetate extract, derived from the broth in which the penicillin has been grown.

Crystalline salts of penicillin with sodium and potassium are known. They have been obtained through long, troublesome, and expensive purification processes in which substantial quantities of the penicillin were lost.

I have now discovered how to obtain these penicillin salts more expeditiously, effectively, and inexpensively than has heretofore been possible, and with less loss; and how the greater part of the process heretofore commonly deemed necessary may be eliminated.

In carrying out my invention, I start with an organic-solvent solution of the free acid penicillin. This organic-solvent solution may be a solution produced by direct extraction with the organic solvent of the filtered broth obtained (as by filtration) from the broth in which the penicillin has been grown in submerged culture, under conditions which give predominantly penicillin G, desirably to a concentration of at least 150 international (Oxford) units of penicillin per cc.; or a later solution derived from that first solution, as by extracting that first solution with a small amount of water of between pH 6.0 and pH 8.0, and re-extracting that water extract with a small amount of an organic solvent, which may or may not be the same organic solvent used for the first extraction. The organic solvent may be any organic solvent which is relatively insoluble in and forms two phases with water, and in which the free acid penicillin is more soluble than in water, and in which the desired penicillin salt is formed as relatively insoluble crystals. This organic solvent is preferably an alkyl acetate in which the alkyl group has not less than three and not more than six carbon atoms, most desirably amyl acetate or butyl acetate or methyl-amyl acetate. In obtaining the organic-solvent solution, the extraction with the organic solvent is desirably done at a low pH value, of the order of pH 2.0 to 3.0.

I mix this organic-solvent solution of the free acid penicillin with an alkali-metal compound of the class consisting of the potassium compounds potassium hydroxide, potassium carbonate, dibasic potassium phosphate, tribasic potassium phosphate, potassium nitrite, potassium molybdate, potassium sulfide, potassium silicate, potassium acetate, potassium benzoate, potassium formate, and potassium salicylate, and the sodium compounds sodium hydroxide, dibasic sodium phosphate, tribasic sodium phosphate, sodium nitrite, and sodium acetate; with the whole as free from water as possible, especially for the sodium compounds, and in any case substantially free from any water not wholly dissolved by the organic solvent.

Whichever of these substances is used, it must be added in such form that the total amount of water present after the addition does not interfere with the substantial insolubility of the penicillin salt desired; which condition varies with the substance used. Thus: potassium hydroxide may be added in alcohol solution in any alkanol having from 1 to 6 carbon atoms, preferably isoamyl alcohol; sodium hydroxide may be added in alcohol solution in either methanol or ethanol; sodium acetate may be added in methanol; potassium hydroxide or potassium carbonate or potassium acetate or sodium acetate may be added in pulverized dry form; potassium hydroxide, dibasic potassium phosphate, tribasic potassium phosphate, potassium nitrite, potassium molybdate, potassium sulfide, potassium silicate, potassium acetate, potassium benzoate, potassium formate, potassium salicylate and dibasic sodium phosphate, tribasic sodium phosphate, sodium nitrate, and sodium acetate may be added in concentrated water solution, provided there is not already so much water in the organic-solvent solution that the added water causes the production of two phases; or any of them may be dissolved in a minimum amount of water; and this water solution then dissolved in a minimum amount of butyl or isoamyl alcohol and the so-formed alcohol solution added. The amount of this added alkali-metal compound should be at least sufficient (if good yields are desired) to produce a pH between pH 5.0 and pH 8.0 in a water solution of the crystals produced, for that will provide enough metallic ions for combination with all the free acid penicillin to form the desired penicillin salt; but care must be taken when the substances are inherently alkaline to avoid adding too much of them to raise that pH above pH 8.0, and desirably to avoid raising the pH higher than about pH 6.6. A pH range of about pH 6.4 to pH 6.6 gives best results.

Desirably, the mixing of the alkali-metal compound with the organic-solvent solution is done after a pre-treatment of that organic-solvent solution with activated decolorizing carbon; which removes undesirable impurities, more particularly coloring matter, which otherwise might carry through into the crystals. On mixing of the organic-solvent solution with the alkali-metal compound, a reaction occurs to produce in the single-phase solution the penicillin salt of the alkali metal used (potassium or sodium); and this penicillin salt separates out because of its insolubility in the organic solvent and because of the absence of sufficient water to interfere with that separation. By proper control of the temperature, this penicillin salt separates out as crystals; which may be directly recovered by simple filtration. I find it desirable to use a temperature between 25° C. and 45° C., preferably about 30° C.; for if a lower temperature is used (such as 8° to 15° C.) there is a greater or less amount of oiliness on the surface of the crystals, and that is avoided by using a temperature in the range noted, while if a temperature much above 45° C. is used fewer or no crystals are obtained. If oiliness does appear on the crystal surfaces, dry crystals may still readily be obtained by washing the oily crystals with n-butyl or n-amyl alcohol; indeed, it is desirable so to wash the crystals in any case.

In practicing my invention, the alkyl-acetate solution with which I start may be prepared as follows:

1. The penicillin is grown in a tank from a suitable submerged culture of *Penicillium notatum* or *Penicillium chrysogenum,* to produce a high concentration of penicillin, desirably as high as possible but in any case one having at least 150 international (Oxford) units per cc. The product so obtained is called the "broth." The growing of the mold is done, in known way, in the presence of suitable compounds which cause the penicillin content produced in the broth to be at least predominantly benzyl penicillin (penicillin G).

2. This broth, after a suitable incubation period, is filtered to remove insoluble matter, including the mold itself; leaving the penicillin in the filtrate, commonly in the form of a salt. This filtrate is commonly called the "filtered broth," and has a high content of benzyl penicillin if those benzyl-penicillin promoting compounds were present during the growth of the mold.

3. The pH of the filtered solution is adjusted well to the acid side, as in the range of pH 2-3. This adjustment of pH is desirably made at this point, although it is possible to make it later, after or in conjunction with Step 4.

4. The filtered broth, desirably already acidulated, is shaken with a relatively small volume of the proper organic solvent—desirably amyl or butyl acetate. The small volume is about 10% to 30% of that of the filtered broth. The amyl or butyl acetate takes up most of the penicillin, usually over 90% of it, in the form of the free acid penicillin.

5. The acetate layer and the water layer are then suitably separated, as by mere standing or in a centrifuge. The water layer may be discarded, with or without further treatment with acetate for higher recovery.

6. At this point the acetate layer may be and desirably is suitably treated with a small quantity (conveniently about ½% to 2%) of activated decolorizing carbon, such as the carbons known as "Norit S. G." and "Nuchar C190N," as by being simply mixed with it or by being filtered through it. The activated decolorizing carbon has the surprising effect of adsorbing impurities, particularly coloring matter, while not materially adsorbing the penicillin.

This separated acetate layer, or solution, is the preferred and usually most advantageous penicillin solution from which I start my process; but if desired there may be the further preparatory Steps 7, 8, and 9, as follows:

7. The acetate layer, with or without the purification of Step 6, is extracted with an aqueous alkaline solution (of the hydroxide or carbonate or bicarbonate) of the desired sodium or potassium base. The aqueous alkaline solution is desirably of much smaller volume than the acetate solution, conveniently of the order of 1% to 10% thereof by volume; and may be a fairly dilute solution, as it is necessary only that there be enough of the base to combine with the penicillin present (and with any other co-present acids) and to give a pH in the resultant water layer of between pH 6 and pH 8. On this mixing, the aqueous alkaline solution takes up the greater part of the penicillin, usually over 90% of it, in the form of the salt of the alkalinizing base, which salt is formed at this stage.

8. The water layer and the acetate layer of Step 7 are suitably separated, as by standing or by centrifuging; and the acetate layer is discarded for recovery of the acetate if desired. The separated water layer, containing the penicillin salt, is retained.

9. This separated water layer is now re-extracted with a small amount—a half volume to an equal volume—of an organic solvent of the class defined above, preferably amyl acetate or butyl acetate or methyl-amyl acetate, at a low pH value, desirably between pH 2.0 and pH 3.0. The acetate at that pH takes up most of the penicillin, as free acid penicillin. This acetate layer is suitably separated from the water layer, and the latter may be discarded. The activated-carbon treatment of Step 6 may be repeated (if desired) on the separated acetate layer.

Either the separated acetate layer (or solution) of Step 9 or the first separated acetate layer (or solution) of Steps 5 or 6 may be the organic-solvent solution from which I start my process.

The following are examples of my process:

*Example 1.*—A filtered broth containing about 350 units of penicillin per cc. was produced in a manner already outlined to make it rich in penicillin G. This filtered broth, after having been adjusted to about pH 2.3, is treated in a continuous extractor with amyl acetate, desirably with both the broth and the amyl acetate at about 10° C. although temperatures even as high as room temperature or slightly higher may be used, and with the amyl acetate approximating one-fifth to one-fourth the volume of the broth.

To 10 liters of the amyl-acetate solution, after separation from the broth, is added 100 g. of activated decolorizing carbon; and the whole is stirred for about 15 minutes, and then filtered to remove the carbon and the impurities adsorbed therein.

To the now-clarified amyl-acetate solution (10 liters) I now slowly add, with stirring, 49 cc. (about 1/200 the volume of the amyl acetate solution) of isoamyl alcohol having approximately 2 g. of potassium hydroxide dissolved in it; and continue the stirring for about an hour at about room temperature. Cloudiness appears practically immediately upon the addition of the alcoholic solution of potassium hydroxide, and this cloudiness increases as the stirring continues; and when the stirring is stopped at about the end of an hour crystals are found to have formed, and will separate out, with clearing up of the solution. This clearing up of the solution is a ready test for the completion of the crystallization. The crystals thus formed are crystals of potassium penicillin; and they may be recovered by filtering, washing with butyl or isoamyl alcohol, and drying.

With the quantities used, the yield is about 5.46 g. of the crystals, which are gray-green in color. The assay of the crystals shown 1595 units of penicillin per mg., and the content of benzyl penicillin (penicillin G) is 91.3%. When the crystals are dissolved in water, the pH of the solution is 6.4. In percentage, the recovery in terms of penicillin units in the original broth was 62%.

The gray-green crystals thus obtained may be recrystallized from acetone; which gives pure white crystals.

*Example 2.*—Example 1 may be repeated, using other alcohols, such for instance as secondary-butyl alcohol, tertiary butyl alcohol, cyclohexyl alcohol, methyl alcohol, ethyl alcohol, n-propyl alcohol, isopropyl alcohol, isobutyl alcohol, n-amyl-alcohol, and n-hexyl alcohol. Using these alcohols with a broth assaying about 540 units of penicillin per cc. instead of the 350 units per cc. of Example 1, yields obtained range from 61% for cyclohexyl alcohol to 71% for ethyl alcohol. Repeating Example 1 with a broth containing about 540 units of penicillin per cc. and using isoamyl alcohol gave a yield of 72%. In every case, the potency of the final crystals was close to the theoretical value for potassium penicillin G—approximately 1595 units per mg.

*Example 3.*—Example 1 is repeated, save that instead of using a broth of about 350 units per cc. a broth of about 410 units per cc. was used, and instead of using an isoamyl-alcohol solution of potassium hydroxide a substantially saturated water solution of potassium acetate is used containing 6.2 g. of potassium acetate in approximately 7 cc. of total liquid. The yield is approximately 60% of potassium penicillin crystals in terms of the penicillin units in the broth. These potassium penicillin crystals initially obtained were of a slightly lighter green then those of Example 1; and assayed 1546 units of penicillin per mg., of which approximately 87% was benzyl penicillin.

*Example 4.*—Example 1 is repeated, save that instead of a broth containing about 350 units of penicillin per cc. a broth containing about 500 units of penicillin per cc. is used, and instead of adding potassium hydroxide in isoamyl alcohol a solution of 1.2 g. of sodium hydroxide in 243 cc. of methyl alcohol is added. This gives crystals of sodium penicillin, with an overall yield of approximately 15%; and the crystals assay approximately 1200 units of penicillin per mg. The crystals of sodium penicillin are a light yellow color; but white crystals may be obtained by recrystallization from acetone.

*Example 5.*—Example 1 is repeated, save that a broth containing about 500 units of penicillin per cc. is used, and instead of adding potassium hydroxide in isoamyl alcohol there is added 3.2 g. of powdered potassium acetate. Potassium penicillin crystals of a light yellow-green color are obtained. The yield is about 15%, in terms of the penicillin units in the initial broth; and the crystals assay 1464 units of penicillin per mg.

*Example 6.*—Example 1 is repeated with different operating temperatures, starting from an initial broth containing about 290 units per cc. With an operating temperature of 8° C., a yield of 46.5% is obtained; at 25° C., a yield of 49% is obtained; and at 35° C., a yield of 42% is obtained. The crystals obtained with an operating temperature of 8° C. were oily in appearance; but the crystals obtained at an operating temperature of 35° C. were substantially free from any oily appearance; and those obtained at an operating temperature of 25° C. were largely free from any oily appearance.

*Example 7.*—Example 1 is repeated, save that the initial broth had a penicillin content of about 510 units per cc., the extraction of the broth was with ¼ volume of n-butyl acetate, and the added alkali-metal compound was 6.64 g. of potassium hydroxide in 133 cc. of n-butyl alcohol. Crystals of potassium penicillin of a light yellow color were obtained, with a yield of 39% in terms of the penicillin units in the initial broth. The crystals assayed 1527 units of penicillin per mg.

*Example 8.*—Instead of using the preferred alkali-metal compounds of the foregoing examples, of which compounds the potassium compounds are preferred over the sodium compounds, others of the alkali-metal compounds named above may be used; but I deem them less preferable.

I claim as my invention:

1. The process of obtaining an alkali-metal salt of penicillin in substantially pure crystalline state directly from a solution of acid penicillin in a hydrophobic organic penicillin-extraction solvent of the class consisting of 3- to 6-carbon-alkyl-group alkyl-actates, in which solution the penicillin is predominantly benzyl penicillin and is present in a concentration not less than about 1600 units per ml., which comprises reacting the acid penicillin in said solution with an alkali-metal compound of the class consisting of potassium acetate, potassium hydroxide, sodium acetate, and sodium hydroxide to convert the acid penicillin to the alkali-metal salt of penicillin, with a small amount of water present during the reaction and with the total quantity of water present and formed in the reaction mixture wholly dissolved in the alkyl-acetate phase upon completion of said reaction so that there is no separate aqueous phase, and regulating the temperature of the reaction mixture to between 25° C. and 45° C., thereby precipitating the alkali metal salt of penicillin directly from the said penicillin-extraction solvent in substantially pure, substantially non-oily crystalline state, the alkali-metal compound being used in an amount to produce a pH between pH 5 and pH 8 in a water solution of the precipitate.

2. The process defined in claim 1 in which the alkali-metal compound used is potassium acetate.

3. The process defined in claim 1 in which the alkali-metal compound used is potassium hydroxide.

4. The process defined in claim 1 in which the alkali-metal compound used is sodium acetate.

5. The process defined in claim 1 in which the alkali-metal compound used is sodium hydroxide.

6. The process of obtaining an alkali-metal salt of penicillin in substantially pure crystalline state directly from a solution of acid penicillin in amyl acetate, in which solution the penicillin is predominantly benzyl penicillin and is present in a concentration not less than about 1600 units per ml., which comprises reacting the acid penicillin in said solution with an alkali-metal compound of the class consisting of potassium acetate, potassium hydroxide, sodium acetate, and sodium hydroxide to convert the acid penicillin to the alkali-metal salt of penicillin, with a small amount of water present during the reaction and with the total quantity of water present and formed in the reaction mixture wholly dissolved in the amyl acetate phase upon completion of said reaction so that there is no separate aqueous phase, and regulating the temperature of the reaction mixture to between 25° C. and 45° C., thereby precipitating the alkali-metal salt of penicillin directly from the amyl-acetate solvent in substantially pure, substantially non-oily crystalline state, the alkali metal compound being used in an amount to produce a pH between pH 5 and pH 8 in a water solution of the precipitate.

JOHN A. LEIGHTY.

REFERENCES CITED

The following references are of record in the file of this patent:

UNITED STATES PATENTS

| Number | Name | Date |
|---|---|---|
| 2,459,315 | Goldberg et al. | Jan. 18, 1949 |
| 2,463,943 | Behrens | Mar. 8, 1949 |
| 2,496,848 | Bernhart | Feb. 7, 1950 |
| 2,520,098 | Hodge | Aug. 22, 1950 |

OTHER REFERENCES

Penn. State Report (44—27), pp. 1–5, Apr. 26, 1944.
Heyden Report H—I, pp. 1–3, May 9, 1944.
Squibb Reports S—XVIII, May 8, 1944, p. 1.
Pfizer Report, Miscellaneous, pp. 24 and 25, P2 1/2/44.